E. J. MOLERA & J. C. CEBRIAN.
Boilers and Condensers for Vapor Engines.
No. 230,323.  Patented July 20, 1880.
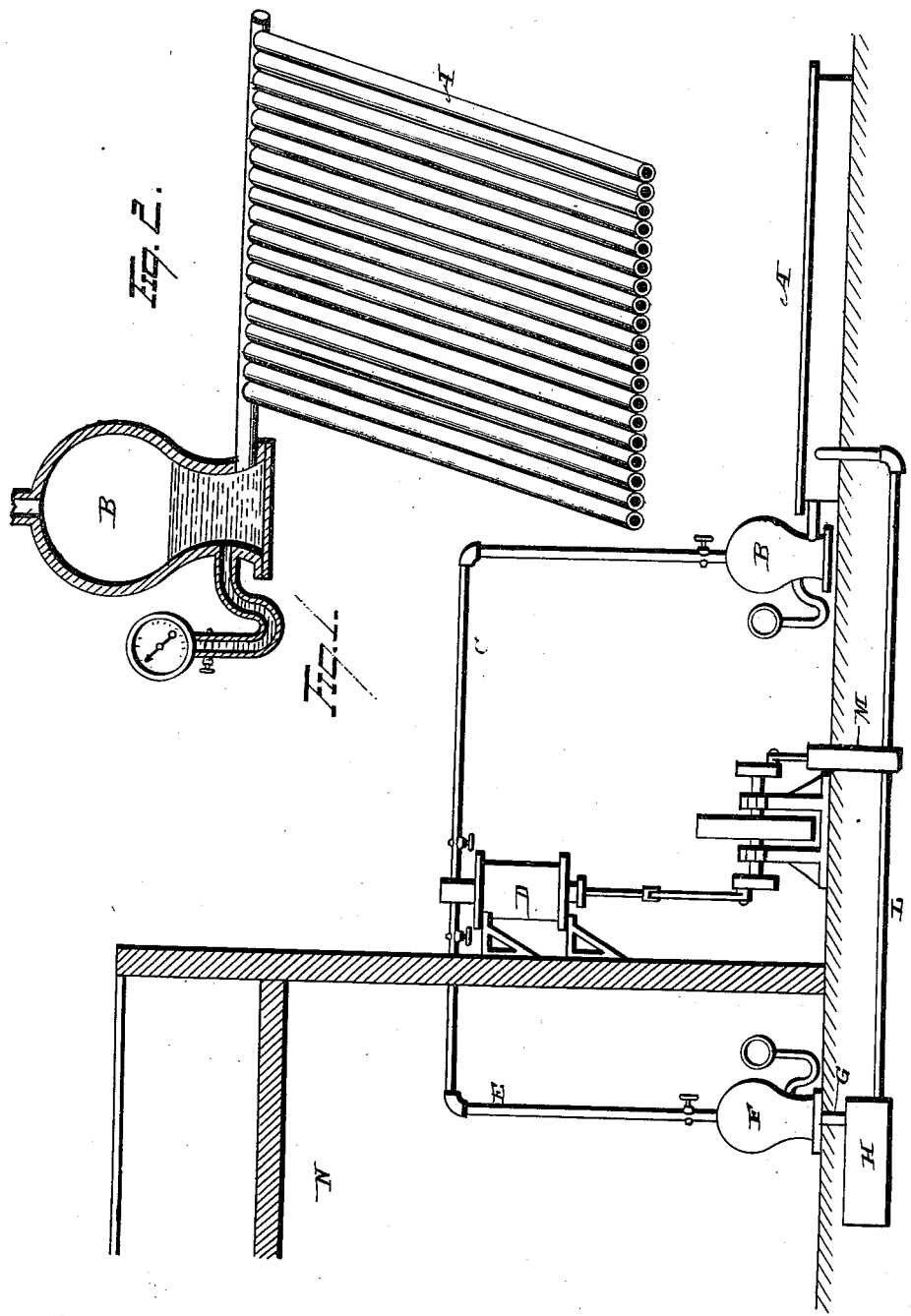
WITNESSES
INVENTOR
ATTORNEY 2 Sheets—Sheet 2.
E. J. MOLERA & J. C. CEBRIAN.
Boilers and Condensers for Vapor Engines.
No. 230,323.   Patented July 20, 1880.
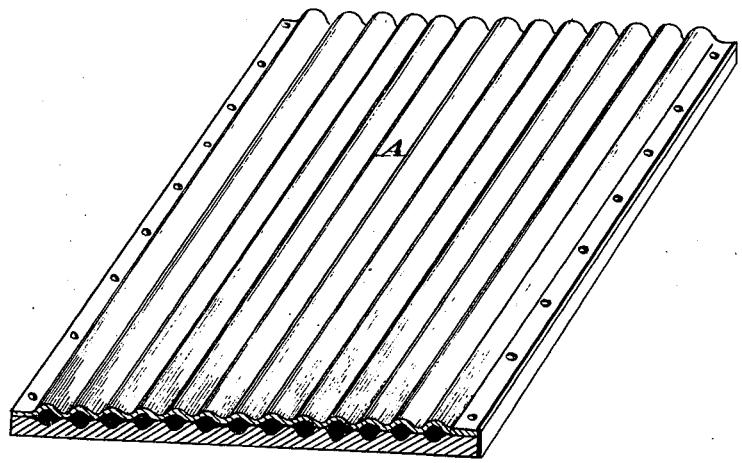
*Fig 3.*
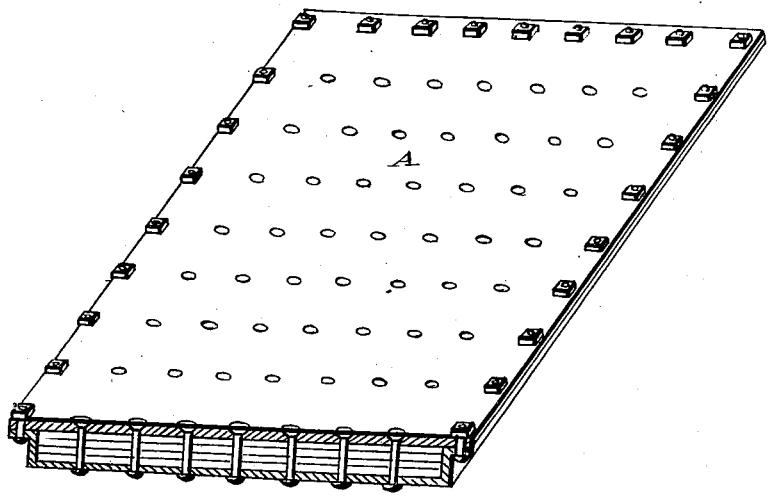
WITNESSES
E. Nottingham
A. W. Bright
INVENTOR
E. J. Molera
and
J. C. Cebrian
By H. A. Seymour, ATTORNEY

UNITED STATES PATENT OFFICE.

EUSEBIUS J. MOLERA AND JOHN C. CEBRIAN, OF SAN FRANCISCO, CAL.

BOILER AND CONDENSER FOR VAPOR-ENGINES.

SPECIFICATION forming part of Letters Patent No. 230,323, dated July 20, 1880.

Application filed February 7, 1880.

*To all whom it may concern:*

Be it known that we, EUSEBIUS J. MOLERA and JOHN C. CEBRIAN, of San Francisco, in the county of San Francisco and State of California, have invented certain new and useful Improvements in Boilers and Condensers for Vapor-Engines; and we do hereby declare the following to be a full, clear, and exact description of the invention, such as will enable others skilled in the art to which it pertains to make and use it, reference being had to the accompanying drawings, which form part of this specification.

Our invention is more especially intended to provide a boiler or condenser for use in connection with the motor-engines patented by us February 4 and March 4, 1879. In said patents, describing an improved method of using as a motor the expansive force of ammonia and other vapors, we mention, among other sources of heat for the purpose of generating said vapor, the heat contained in the solar rays, thermal springs, mines, &c., received and collected by proper boilers or heat-receivers.

The object of our present patent is to supply the proper boilers to collect the comparative low temperatures present in the above-named and similar sources of heat.

The solar heat, as a source of power, has been utilized before—among others, in the well-known solar engines by Ericsson, Adams, and Mouchat; but on account of employing the expansive force of air and vapor of water, they all need a heliostat and reflector to concentrate the rays of the sun on the boiler. These two requirements have limited the use of such engines to small dimensions and have prevented their use for practical purposes. Also, heretofore vapor has been raised to a suitable degree of tension by being introduced in a chamber provided with steam-pipes, the heat of said pipes serving to expand the vapor within the chamber.

Our improvement differs from this last method of expanding vapor, in that we do not employ any interior heating means, neither do we bring the liquid or vapor in direct contact with any heating medium; but we cause the temperature of the atmosphere or substance which surrounds the shell to affect the contents of the latter, so that said contents are vaporized or condensed solely by the action of said temperature on the exterior of the shell.

Our boiler consists, essentially, of two parallel shells of various forms, suitably connected, leaving between each other a narrow space, which is filled with the liquid to be vaporized, and which vapor is used to move the motors. They are placed horizontally, or nearly so, and do not require to be changed in their position for the daily movement of the earth. As they expose a large surface to the source of heat, and the mass of liquid is in near contact to the metallic plates of the boiler, the heat received by the latter is readily absorbed by the liquid, and the generation of the vapors is very rapid.

We also use similar vessels for the absorption of cold, in order to condense said vapors after they leave the motors, and in this way we increase the available pressure of the motor by creating a partial vacuum on the egress side of it. Snow, water, or even air when cold will reduce sufficiently the temperature of the absorbing liquid when the condensers are large enough.

Our main object is to cause the contents of the boiler or condenser to be rapidly and sensibly affected by slight variations in temperature of the atmosphere surrounding the boiler or condenser.

Referring to the drawings, Figure 1 illustrates our invention applied in use. Fig. 2 is a detail perspective of the boiler or condenser. Fig. 3 represents several different modifications of said boiler or condenser.

The boiler or condenser may be made with one or more metallic shells, A, the latter being of any desired form and construction, provided they are adapted to provide a large surface-exposure for their contents. The drawings represent some of the different forms in which these shells may be made and combined with this end in view.

The boiler A is preferably located in horizontal inclination, so as to be freely exposed to the rays of the sun, and also permit the expanded vapor to pass out therefrom into the dome B. From the latter the expanded vapor passes through a pipe, C, to an engine, D, the latter preferably being one of our own patented engines previously referred to. It is evident, however, that any engine may be used which is adapted to be actuated by vapors which at comparatively low temperatures acquire great tensional force.

Connected with this engine is an exhaust-pipe, E, which leads to a receiver, F, and from the latter passes a pipe, G, which connects with the condenser H.

A pipe, L, is adapted to pass the condensed vapor from the condenser to the boiler, and a pump, M, actuated by the vapor-engine, forces the condensed vapor through said pipe.

The condenser and receiver are placed in a building, N, or in a cellar, or other place adapted to protect them from the heating action of the free atmosphere during day-time, and also to protect them from the cooling action of the open atmosphere during night-time. In this manner it is evident that whatever vapor in solution is first introduced into the boiler, it will be effectively exposed to the sun's rays, the vapor expanding therefrom will pass into the engine, and after acting therein will be exhausted into the receiver. From said receiver the vapor will be subjected to the action of the condenser, and the condensed vapor is then reintroduced into the boiler.

It is also apparent that, by reason of boiler A being exposed to the open atmosphere and condenser H being protected from the latter, their respective functions may interchange for night season, the day boiler A being a night condenser, and the day condenser H being a night boiler.

If desired, the apparatus for condensing and returning the vapor to boiler A may be omitted. In this case the pump would force liquefied vapor from any feed-source through pipe L into the boiler.

Changes, substitutions, and omissions may be made as regards the previously described means, provided the essential features of invention set forth in the following claims are employed.

Having fully described our invention, what we claim as new, and desire to secure by Letters Patent, is—

1. In apparatus for generating motive power by the expansive force of certain vapors, the combination, with an engine and intermediate connecting means, of one or more shells, A, providing large exterior surface-exposure and adapted to either vaporize or condense their contents by the action thereon of the temperature of the surrounding atmosphere or substance, substantially as set forth.

2. In apparatus for generating motive power by the expansive force of certain vapors, the combination, with an engine and intermediate connecting means, of one or more metallic shells, A, adapted by their horizontal location and slight thickness to provide a large exterior surface-exposure to the direct rays of the sun, and thereby vaporize their liquid contents, substantially as set forth.

3. In apparatus for generating motive power by the expansive force of certain vapors, the combination, with an engine and intermediate pipes which connect therewith, of one or more metallic shells exposed to the open atmosphere, and one or more metallic shells protected from the open atmosphere, said exposed shell or shells being adapted to serve as a boiler by day and a condenser by night, said protected shell or shells being adapted to serve as a condenser by day and a boiler by night, substantially as set forth.

In testimony that we claim the foregoing—

I, EUSEBIUS J. MOLERA, do hereunto set my hand this 16th day of January, A. D. 1880.

EUSEBIUS J. MOLERA.

Witnesses:
THOMAS D. GRAHAM,
F. O. WEGENER.

And I, JOHN C. CEBRIAN, do hereunto set my hand this 15th day of December, A. D. 1879.

JOHN C. CEBRIAN.

Witnesses:
T. B. HALL,
A. W. BRIGHT.